United States Patent [19]

Chang

[11] 4,104,685
[45] Aug. 1, 1978

[54] VIDEO RECORDER/REPRODUCER TRANSPORT HAVING TWO MOVABLE TENSION GUIDES FOR CONTROLLING TAPE TENSION

[75] Inventor: David T. L. Chang, Palo Alto, Calif.

[73] Assignee: Recortec, Inc., Sunnyvale, Calif.

[21] Appl. No.: 759,238

[22] Filed: Jan. 13, 1977

[51] Int. Cl.$^2$ .................... G11B 15/43; G03B 1/04; B65H 59/38; B65H 63/02
[52] U.S. Cl. ........................................ 360/84; 360/71; 242/189; 242/190; 242/75.3
[58] Field of Search ............... 360/71, 84; 242/190, 242/189, 75.3

[56] References Cited
U.S. PATENT DOCUMENTS

| | | | |
|---|---|---|---|
| 3,377,436 | 4/1968 | Maxey et al. | 360/71 |
| 3,491,968 | 1/1970 | Jennings et al. | 242/190 |
| 3,497,158 | 2/1970 | Calaway | 242/190 |
| 3,898,693 | 8/1975 | Chang | 360/71 |
| 3,941,332 | 2/1976 | Matula | 242/189 |

Primary Examiner—Robert S. Tupper
Attorney, Agent, or Firm—Boone, Schatzel, Hamrick & Knudsen

[57] ABSTRACT

A video recorder/reproducer tape transport including a supply reel, a take-up reel, a helical scanner head assembly for recording and reproducing signals on the tape in a helical scan format, a capstan, a first movable tension tape guide positioned within the tape path intermediate the scanner head assembly and one of said reels and being movable under tension between a first location and a second location, the first movable tension tape guide being constantly under tension urging it towards the first location in opposition to the tension on the tape, and a second movable tension tape guide positioned within the tape path intermediate the other of the reels and the capstan, and being movable under tension between a third and a fourth location, the second movable tension tape guide being constantly under tension urging it toward the third location in opposition to the tension on the tape.

5 Claims, 6 Drawing Figures

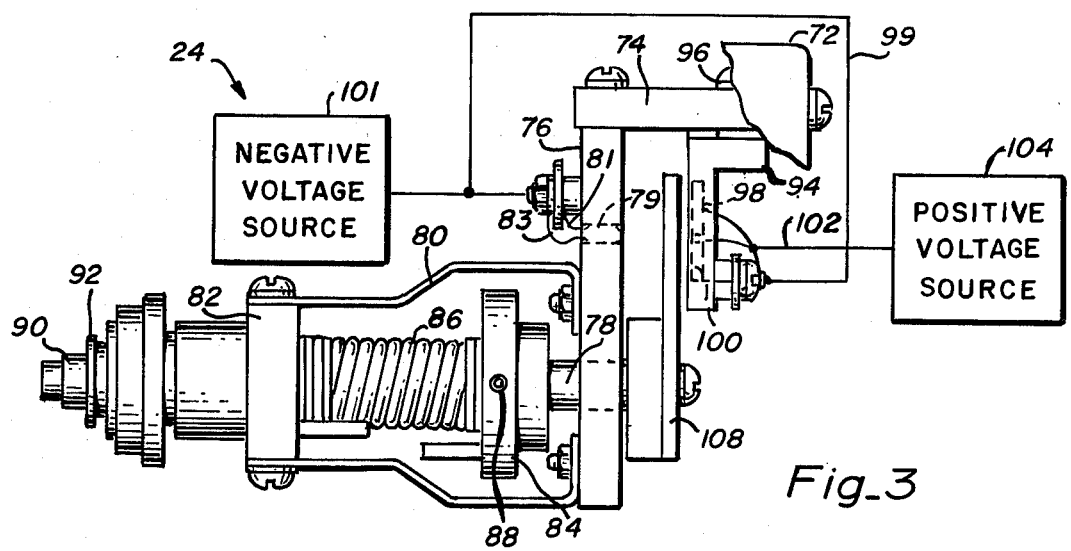
Fig_3
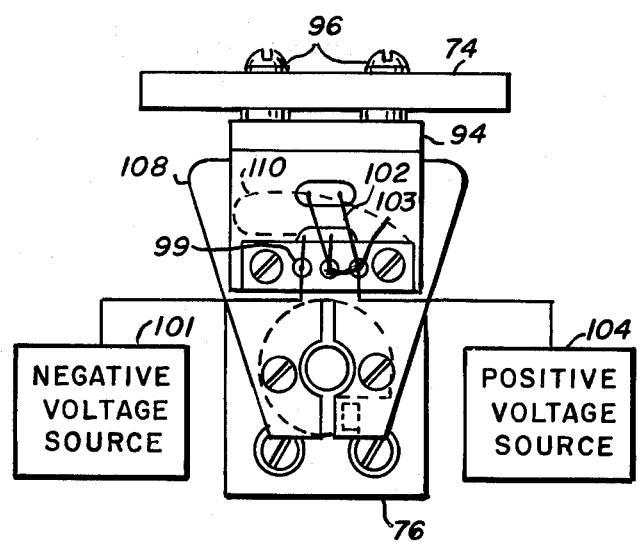
Fig_4

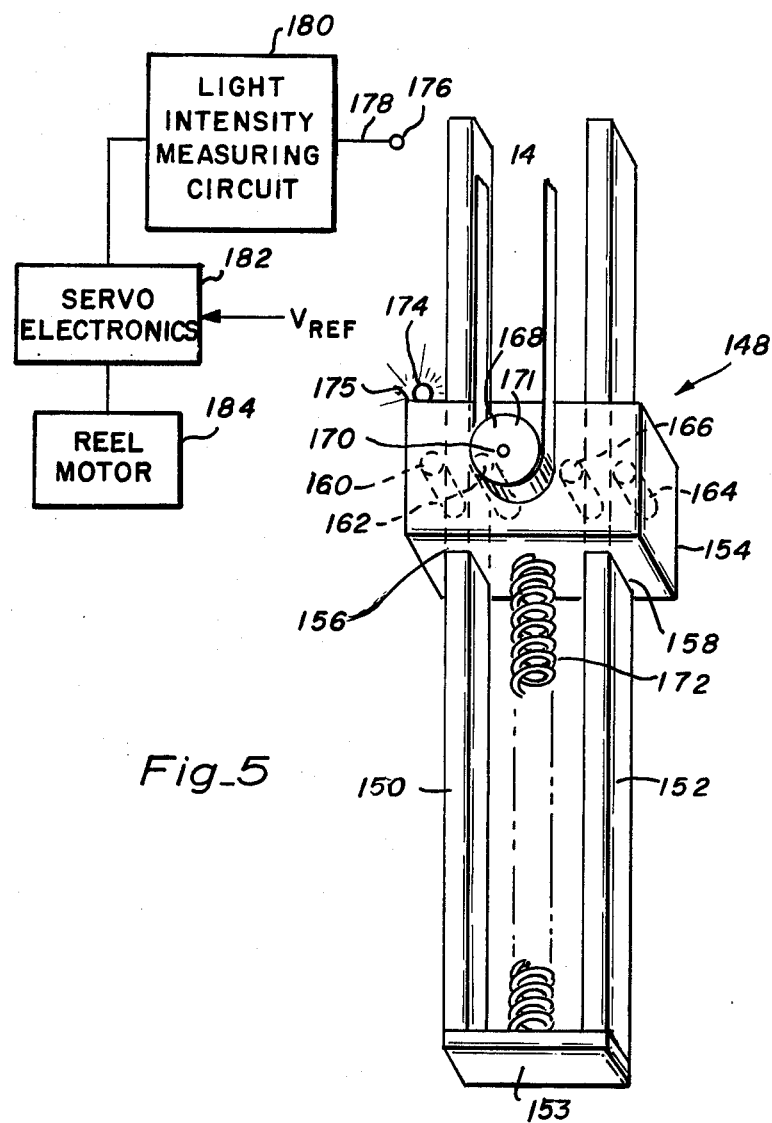
Fig_5
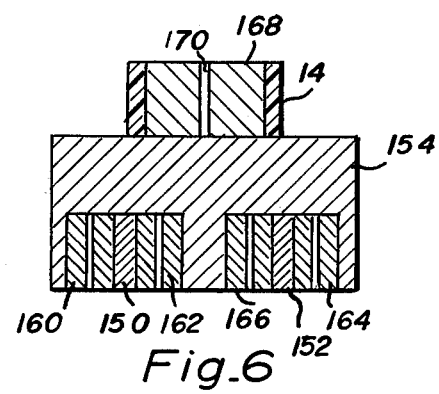
Fig_6

VIDEO RECORDER/REPRODUCER TRANSPORT HAVING TWO MOVABLE TENSION GUIDES FOR CONTROLLING TAPE TENSION

BACKGROUND OF THE INVENTION

1. Field of the Invention

The present invention relates generally to magnetic recording and reproducing apparatus and more particularly, to a video recorder/reproducer tape transport employing spring-loaded guides intermediate the take-up reel and the capstan and intermediate the scanner head assembly and the supply reel for controlling the tension on the tape.

2. Description of the Prior Art

Tape transports for use in magnetic tape recording and reproducing of high frequency electronic signals are well known. Such transports generally include a tape deck with supply and take-up reels for storing the magnetic tape. The reels are rotatably supported on the tape deck on opposite sides of a transducer adapted to transduce electrical signals to and/or from the magnetic tape. A rotatable drive capstan, mounted to the deck, operates to drive the tape at a predetermined speed between the supply and take-up reels. The tape is guided over the transducer between the supply and take-up reels by an arrangement of guides. For recording and reproducing high frequency signals such as video signals, the transducers are mounted on a rotatable circular scanner assembly, which in turn is mounted to the tape deck. The rotational speed of the scanner and the tape speed each assist in providing the head-to-tape speed necessary for recording and/or reproducing video signals. The scanning assembly generally includes one or more transducing heads which operate to translate electrical signals to magnetic variations for storage on the tape during the record operation or which operate to translate magnetic signals from the tape into the original signal during the reproduce operation.

In recording and reproducing broad band signals on magnetic tape, a helical wrap type of scanning assembly is often used. Basically, such a scanning assembly includes a pair of coaxial, cylindrical drums of aproximately four to six inches in diameter. The drums are axially spaced to define an annular gap therebetween. The drums support one or more transducer heads which are used to record and/or reproduce signals from the tape. Magnetic tape, generally of approximately one inch width, is wrapped helically about the drums and is moved over the drums in the direction of its length. The transducer heads are rotated in the gap between the drums and sweep a rectilinear area extending at an acute angle across the tape. As a result, relatively long tracks extending at acute angles to the edge of the tape are successively spaced along the tape. In the recording and playback of television signals, an entire field or, in some instances, an entire frame may be included in one of the relatively long tracks.

Many prior art transports have a tape path wherein the tape is wrapped substantially 360° in helical fashion about the scanning assembly. In one type of tape wrap, known as the Omega wrap, the tape approaches and leaves the surface of the scanning assembly at approximately the same point and forms a loop about the scanning assembly approximating the shape of the Greek letter "capital Omega".

In one prior art helical wrap-scanning assembly, two vacuum chambers are included to control the quantity and tension of tape available at the scanner. The vacuum chamber tends to isolate speed and tension disturbances in the tape supplied by the supply reel. There are numerous causes of disturbances in the tape as it is supplied from the supply reel. For example, such disturbances occur when the tape scrapes a flange of the reel or has an irregularity in its structure, when the brush friction varies, when the reels are eccentric, etc. However, vacuum chambers require a vacuum source. Thus, vacuum chamber transports are relatively large, produce an audibly distracting noise during operation and are relatively expensive. An example of a video recorder employing helical wrap-scanning assembly and a vacuum system is found in my earlier U.S. Pat. No. 3,898,693, entitled "Video Recorder/Reproducer Transport Using Vacuum Columns and Servos".

Another type of transport that is extensively used for television broadcast recording and reproducing is one commonly referred to as the "quadruplex" recorders. Such a transport includes a rotary head assembly with four transducers mounted thereon that transverses the tape in a direction at right angles to the edges of the tape. Quadruplex recorders have been found to produce pictures of good quality. However, the complexity and costs of quadruplex recorders have been substantially greater than that of helical wrap type recorders. Also, the operating costs, wear of transducers and wear of tape of quadruplex recoders are substantially greater.

Thus, heretofore in many instances it has been a trade off of quality versus costs in determining whether to use quadruplex or helical scan format type transports. As a result, the quadruplex transport has been more widely used for broadcast purposes where picture quality is of prime concern. The helical scan transport has found more use in educational, industrial and communication applications which do not require the picture quality level demanded by the broadcast industry.

In video tape recorder/reproducers of the helical scan format, tension control of the tape is important due to the excessive tape friction in the tape path. Therefore, the tape tension should change whenever the tape direction changes. For example, when tape is being transferred from the supply reel to the take-up reel, the tension at the supply reel should be low relative to the tape tension at the take-up reel. This will allow the capstan to drive the tape easier and tension in the tape path will not be so high as to damage the tape. For similar reasons, when the tape is rewound from the take-up reel to the supply reel, the tape tension at the supply reel side should be high relative to the tape tension at the take-up side.

SUMMARY OF THE PRESENT INVENTION

Accordingly, an object of the present invention is to provide a video magnetic recording and reproducing apparatus wherein the tape tension intermediate each reel and the capstan varies according to the direction of travel of the tape.

Another object is to provide a video magnetic recording and reproducing apparatus that is compact, lightweight, and simple in construction, which produces no appreciable noise during operation and which is relatively inexpensive to manufacture.

Yet another object is to provide video recording and reproducing apparatus of the helical wrap type that is capable of providing rapid operational start and stop times without requiring a vacuum system to isolate the drive capstan from the tape supply and take-up reels.

Briefly, a preferred embodiment of a video tape transport of the present invention includes a pair of movable tension loaded guides mounted on a tape deck. The transport is of the helical wrap format with a tension loaded guide positioned intermediate the supply reel and the scanner head. Another tension loaded guide is positioned intermediate the capstan and the take-up reel. Mechanisms are included to vary the take-up and supply reel speeds responsive to the position of the tension loaded guides. Accordingly, the tension on the tape intermediate the capstan and reels may be controlled depending on the position of the guides and the direction of the tape travel.

Among the advantages of the present invention are its low cost and simple, compact and durable structure.

Another advantage of the present invention is that it is virtually noise-free during operation.

Still another advantage of the present invention is that it provides rapid operational start and stop of the magnetic tape.

Other objects and advantages of the present invention will be apparent to those skilled in the art after having read the following detailed description of the preferred embodiments illustrated in the several figures of the drawing.

IN THE DRAWING

FIGS. 3 and 4 are partial side elevation and end views, respectively, of the movable guide assembly;

FIG. 5 is a perspective view of an alternative embodiment of a movable guide assembly; and FIG. 6 is a cross-section view taken through the line 6—6 of FIG. 5.

DETAILED DESCRIPTION OF THE PREFERRED EMBODIMENTS

Figure 1:
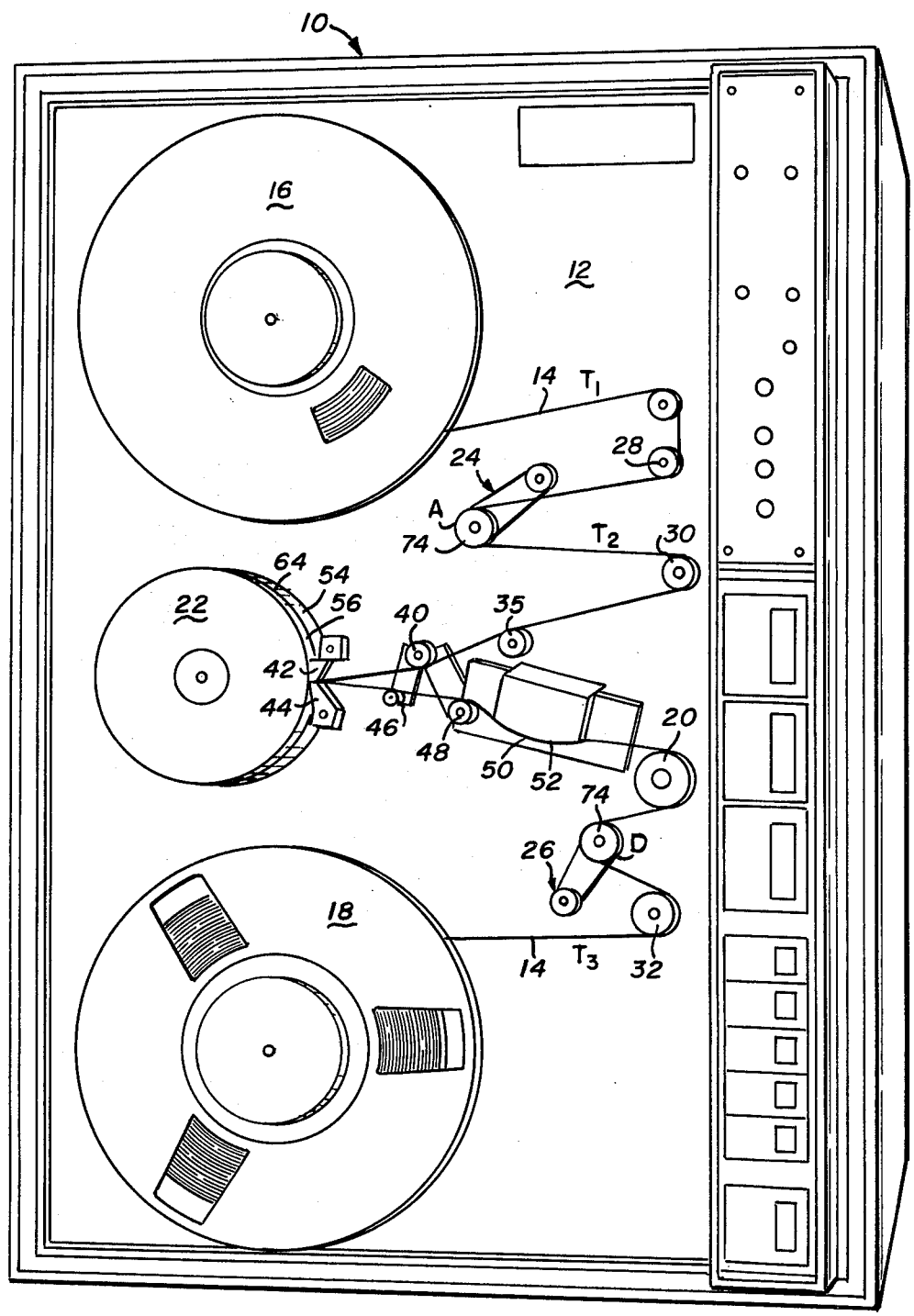
FIG. 1 is a perspective view of a video tape transport in accordance with the present invention.
Figure 2:
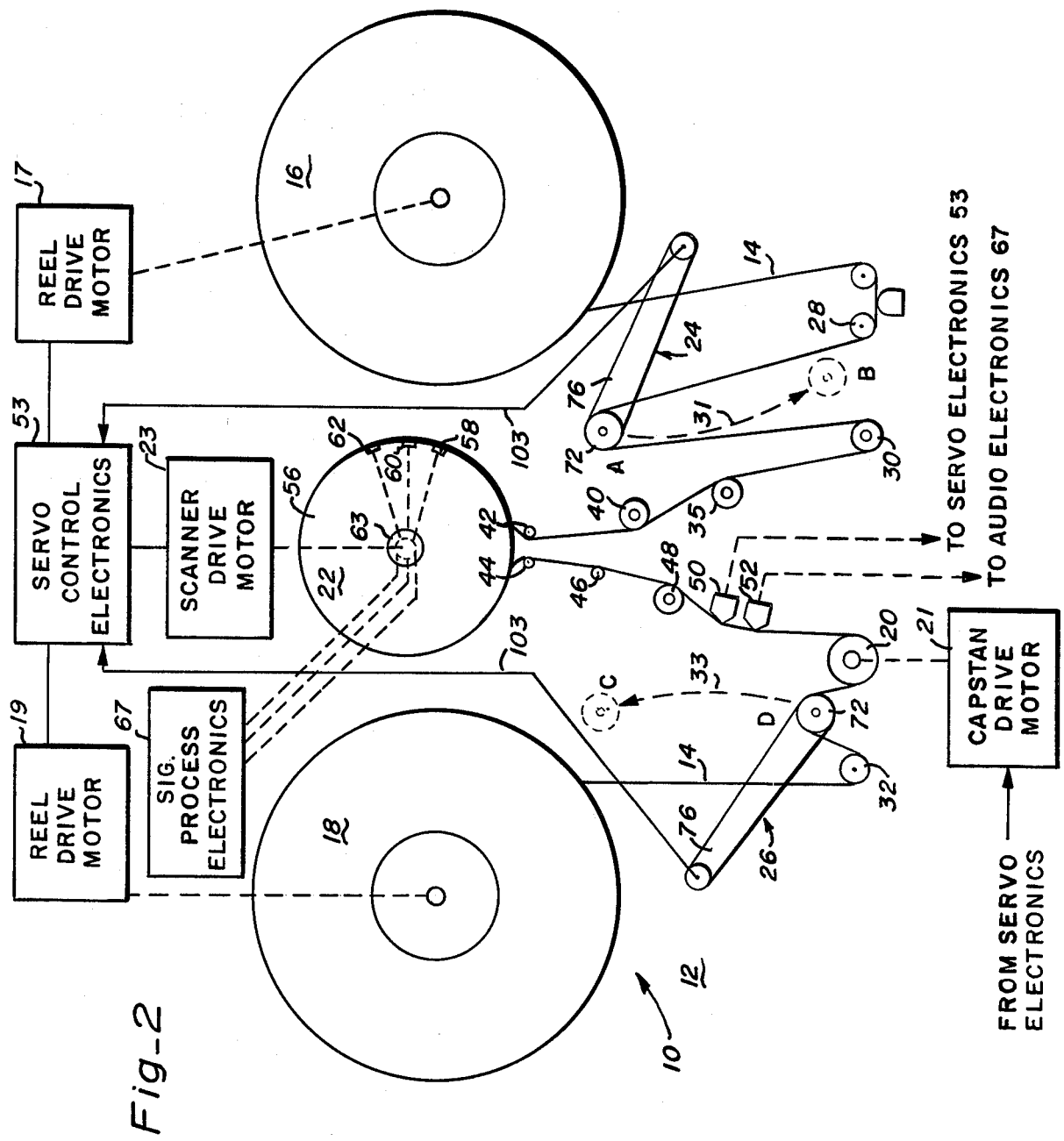
FIG. 2 is a schematic diagram of the tape path of the transport of FIG. 1.

A tape transport, referred to by the general reference character 10, and incorporating the present invention is illustrated in FIG. 1. FIG. 2 further schematically illustrates the transport 10 along with the servo control electronics and signal processing electronics. The view of FIG. 2 represents the transport 10 in an orientation rotated 90° relative to the view of FIG. 1. The transport 10 includes a flat mounting panel 12 over which a magnetic tape 14, typically having a width of one inch, is transported. The tape 14 is transported between a tape supply means, illustrated in the form of a supply reel 16 driven by a drive motor 17 and a tape take-up reel 18 driven by a drive motor 19. The tape 14 is driven by a cylindrical capstan 20 controlled by a drive motor 21. The tape 14 is transported over a data processing center including a helical wrap scanner 22 driven by a scanner drive motor 23. The supply reel 16, take-up reel 18, capstan 20 and scanner 22 are all mounted on the panel 12 in spaced apart relationship and rotatable about axes normal to the plane of the panel. The drive motors 17, 19, and 21 are housed within the transport 10.

The transport 10 further includes a pair of movable tension arm guide assemblies 24 and 26. The guide assembly 24 is positioned intermediate the supply reel 16 and the scanner 22 and the guide assembly 26 is positioned intermediate the scanner 22 and the capstan 20.

Guide assembly 24 engages the tape 14 intermediate a pair of cylindrical guide spindles 28 and 30 and is movable between an inner location A and an outer location B along a path 31 indicated by the dashed lines in FIG. 2 in a manner as will be subsequently described in detail. Also, a guide spindle 32 is positioned laterally from the capstan 20. An arm of the guide assembly 26 engages the tape 14 intermediate the capstan 20 and the guide spindle 32 and is movable between an inner location C and an outer location D as shown in dashed lines 33 and in a manner similar to that of the guide assembly 24. The guide assemblies 24 and 26 serve to provide a buffer between the head scanner assembly 22 and the larger mass of the supply and take-up reels 16 and 18, respectively, and are adapted to generate positional control signals to the servo control electronics 53 corresponding to their position relative to the inner and outer positions and in accordance with the mode of operation. Each of the guide spindles 28, 30 and 32 is rotatable about its axis, which is parallel to the axes of the reels 16 and 18, so as to provide low friction guidance to the tape 14 as it approaches and leaves the guide assemblies 24 and 26. Intermediate the guide spindle 30 and the scanner 22 is a guide spindle 35 and a stationary guide 40 positioned to align the tape 14 relative to the entrance to the scanner head assembly 22.

An entrance guide post 42 is positioned immediately adjacent to the periphery of the scanner 22 at the point where the tape 14 enters the scanner head assembly. An exit guide post 44 is positioned laterally from the guide post 42 immediately adjacent to the periphery of the scanner 22 at the point where the tape 14 exits from the scanner head assembly. Thus, as illustrated in FIG. 2, the tape is guided over the interior surface of the guide 42, about the scanner 22 and over the interior surface of the guide 44 so as to form a wrap format of a shape similar to the Greek capital letter Omega. The guide posts 42 and 44 are stationary in place such that the angle and location of the entrance and exit point of the tape from the scanner head assembly 22 are fixed. Intermediate the guide post 44 and the capstan 20 is a stationary guide 46 and a spindle guide 48 and two stationary head assemblies 50 and 52. The record head 50 is electrically coupled to the servo electronics 53 and is adapted to record and play back information on and from a control track positioned longitudinally along the edge of the tape 14. The audio record head 52 is adapted to record and play back information on and from a pair of audio tracks positioned longitudinally on the tape 14.

The scanner head assembly 22 includes a pair of coaxially closely spaced drums 54 and 56, respectively. The drum 54 is stationary and the drum 56 is coupled to the drive motor 23 such that it may be rotated about its axis.

As further illustrated in FIG. 2, three magnetic heads 58, 60 and 62, electrically coupled to a rotary transformer 63, are supported at the peripheral surface of the rotatable drum 56 adjacent a clearance gap 64 axially between the drums 54 and 56. The heads 58, 60 and 62 are angularly spaced apart by approximately twenty degrees relative to the axis of the drum 56. In operation, the tape 14 enters the scanner assembly 22 at the lower stationary drum 54, is transported helically about the drums 54 and 56, and exits about the upper rotary drum 56. The elevation of the tape at the point of entry is beneath the point of exit from the scanner 22 and the wrap of the tape 14 about the drums 54 and 56 is substantially diagonally bisected by the clearance gap 64. The heads 58, 60 and 62 are always at the same elevation and serve to scan diagonally across the tape. Since the path of the heads relative to the tape forms a relatively small acute angle with the tape edges, the heads are able to scan relatively long paths across the tape.

The head 58, hereinafter referred to as the video erase head, is adapted to erase previously recorded information from the tape. The head 60, hereinafter referred to as the video record head, is adapted to produce a record track on the tape 14 as the head scanner rotates one revolution and the tape 14 passes thereover. Successive revolutions of the video record head 60 while the tape is transported, produces record tracks. The head 62, hereinafter referred to as the video playback head, is adapted to reproduce the information from recorded tracks on the tape 14 as the head scanner 22 rotates and the tape 14 passes thereover.

The video erase head 58, video record head 60 and video playback head 62 are all coupled through the rotary transformer 63, to signal processing electronics 67 where the high frequency video signals are processed. Also, as previously mentioned, the audio record head 52 is coupled to the signal processing electronics 67 for processing of the audio information.

Referring also to FIGS. 3 and 4, the tension arm guide assembly 24 is illustrated, it being understood that the guide assembly 26 is identical in construction to the guide assembly 24. Each guide assembly 24 and 26 includes a guide 72 (partially shown in FIG. 3) that is mounted to a coaxial stud 74, and extends normally from the panel 12. The guide 72 serves as a light shield. The stud 74 is mounted to one end of an extension arm 76, the arm having its other end secured to a stationary shaft 78. A light source 79 having a conductor 81 connected to ground and a conductor 83 connected to a source 101 of negative 12 volt potential is mounted to the arm 76 in such a manner that it serves to emit a beam of light in a direction normal to the panel 12, in a manner well known in the art. A housing 80 having a coaxial relationship relative to the shaft 78 is fastened to the inner surface of the arm 76 and to an opposed bushing 82. A bushing 84 is disposed on the shaft 78 intermediate the bushing 82 and the arm 76 and a torsion spring 86 is coiled around the shaft 78 and anchored to the bushings 82 nd 84. A set screw 88 secures the bushing 84 to the shaft 78 and a nut 90 and a washer 92 serve to anchor the shaft 78 to the panel 12. An L-shaped plate 94, is secured by a pair of bolts 96 to the stud 74. A pair of photocells 98 and 100 are mounted to the plate 94 in optical alignment with the beam emitted by the light source 79. The photocells 98 and 100 are connected in a series configuration with one terminal of the photocell 98 being connected by a conductor 99 to the source 101 of negative 12 volt potential, and one terminal of the photocell 100 being connected by a conductor 102 to a source 104 of positive 12 volt potential and the common terminals of the photocells 98 and 100 being designated by the numeral 103. A plate 108 is secured to the end of the shaft 78 that extends through the housing and the extension arm 76. The plate 108 resembles an inverted trapezoid in end view and has a curved slot 110 therethrough as indicated by the dashed lines in FIG. 4. The slot 110 is arranged so that the maximum amount of light emitted by the source 79 reaches the photocells when the shaft 78 is in its unrotated position. Since the plate 108 is stationary, as the arm 76 rotates relative to the shaft 78, the amount of light emitted by the source 79 that reaches each of the photocells 98 and 100 through the slot 110 varies depending on the relative position to the slot 110. Each photocell 98 and 100 develops an output signal across its terminals representative of the light impinging the photocell. Accordingly, the magnitude of the signal appearing on the conductor 103 corresponds to the difference in the output signals appearing across the photocells 98 and 100 and corresponds to the position of the guide 24.

As previously mentioned and referring to the path 31 in FIG. 2, as the guide 24 moves between positions A and B the signal appearing on conductor 103 varies as a function of guide position in a manner such that at position A, the tape tension is high relative to that at positions B. Similarly, as the guide 26 moves along the path 33 between positions C and D the signal appearing on the conductor 103 is such that at position C, the tape tension is high relative to that at position D.

In operation, tape 14 is transported intermediate the reels 16 and 18 as shown in FIG. 2. During the record and playback modes, tape is transported from the supply reel 16 to the take-up reel 18. During the rewind mode, tape is transported from the take-up reel 18 to the supply reel 16. The tolerable tape tensions at the reels vary depending upon the mode of operation.

For example, in the record and playback modes, when tape is transported from reel 16 to the reel 18, the tension of the tape has the following relationship $$T_2 = T_1 \times f \qquad (1)$$

where $T_2$ is the tape tension in ounces at the capstan 20;

$T_1$ is the tape tension in ounces between the reel 16 and the capstan 20; and $f$ is a constant determined by the friction in the tape path between the roller 30 and the capstan 20.

It is generally advisable to establish $T_2$ within a value of nine to fifteen ounces. Also, the constant $f$ is generally within a range of three to five. Therefore, in the record and playback modes, $T_1$ should be in the order of three ounces.

The driving torque required at the capstan is also a function of the tape tension and is defined by the formula $$Q = (T_2 - T_3) \qquad (2)$$

where

Q is the torque of the capstan 20 in ounce-inches;

r is the radius of the capstan in inches; and $T_3$ is the tape tension in ounces between the reel 18 and the capstan 20.

Substituting equation (1) into equation (2) provides $$Q = (T_1 f - T_3)r \qquad (3)$$

From the preceding relationship, it should be recognized that in order to keep the magnitude of Q small, $T_1$ should likewise have a small magnitude. Also, in transporting tape from the reel 16 to reel 18 the tension $T_1$ should be maintained at about 3 ounces and $T_2$ should not be too large to prevent damage to the tape.

From equation (2) it should be recognized that when $T_2$ equals $T_3$ no capstan motor torque is required. Accordingly, the capstan motor can be replaced by a tachometer if cost reduction is desired. This results in a smoother tape drive in the record and playback modes.

In the rewind mode with the tape transported from the reel 18 to the reel 16, $T_1$ has a generally fixed maximum value corresponding to that recommended by the tape manufacturer to establish a satisfactory tightness of the wind on the reel. Typically, $T_1$ value is in a range between ten and thirteen ounces.

From equations (1) and (3), it can be recognized that in the rewind mode slippage is avoided by maintaining the magnitude of the capstan torque Q small. Consequently the tension $T_3$ is maintained between two and four ounces.

As described, the tensions $T_1$ and $T_2$ differ depending on the mode of operation of the tape transport with $T_1$ generally varying between 3 and 13 ounces. When the tape has the desired tension the guides 24 and 26 are arranged as shown in FIGS. 1 and 2.

In operation, the output signals from the photocells 98 and 100, which correspond to the position of the guides 24 and 26, are applied via the conductors 103 to a logic portion of the servo control electronics 53 for processing and comparison with a reference voltage and to enable the appropriate servo control signals to be developed. Such servo control signals are applied to the capstan drive motor assembly 21, reel motor drives 17 and 19, and the scanner drive motor 23 such that precise speed control of the tape is preserved during the various modes of operation.

Electronic servo control means, such as servo control electronics 53 of the present invention, are well known in the prior art. For instance, U.S. Pat. Nos. 3,898,693 and 3,491,968 both disclose servo control means comparable to that incorporated in the present invention.

It has been found that the tension guide assemblies 24 and 26 in the transport path isolate the high mass reels 16 and 18 from the capstan 20 and the scanner 22 and provide gentle, but firm, handling of the tape 14 over the head scanner 22. The guide assemblies also establish a sufficient loop or supply of tape to be formed. This permits the reels to catch up after the processing has commenced. Consequently, rapid start and stop responses are achieved during the record and playback operations since it is not necessary for the supply and take-up reels to come up to speed before processing of the information can commence. For example, the start-up and stop responses are about one second for transports of the present invention. Also, the tape guide assemblies 24 and 26 are durable, compact and relatively noise free during operation.

FIGS. 5 and 6 illustrate an alternative embodiment of a tension guide assembly 148 in accordance with the present invention. As shown, the assembly includes a pair of lateral guide rails 150 and 152 affixed to a cross-plate 153 that is mounted to the panel 12 of the transport 10. A carriage 154 with a pair of lateral grooves 156 and 158 is slidably mounted on the rails 150 and 152. The carriage 154 includes a first pair of rotary bushings 160 and 162 (shown in dashed lines) and a second pair of rotary bushings 164 and 166 (shown in dashed lines) which serve to engage opposite lateral sides of the rails 160 and 162, respectively, to facilitate sliding movement of the carriage. A low friction roller 168 having a shaft 170 is rotatably mounted to the top surface of the carriage. The roller 168 includes a peripheral tape-receiving surface 171 for guiding the tape 14. A tension spring 172 extending in a direction corresponding to that of the rails 150 and 152 is secured between an edge of the carriage 154 and the cross-plate 153. A light source 174 is mounted to the outer surface 175 of the carriage and is arranged to emit a beam of light in a direction generally parallel to the rails 150 and 152. A photocell 176 having an output 178 is mounted to the panel 12 with a mounting assembly (not shown). The photocell 176 responds to the quantity of light striking it and produces a signal on output 178 that corresponds to the intensity of the light. A light intensity measuring circuit 180 is connected to the output 178 and provides a transformed signal corresponding to the position of the carriage 154. A servo electronics network 182 responds to the transformed signal and a reference voltage, $V_{ref}$, and develops appropriate servo control signals for application to the reel motors 184 (only one of which is shown), the capstan drive motor and the scanner drive motor. As previously described, this occurs in such a manner as to preserve speed control of the tape during the various modes of operation.

In operation, the tape 14 is wound around the surface 171. Depending on the voltage applied to the reel motor, the carriage 154 moves linearly along the rails 150 and 152 against the tension of the spring 172. Moreover, the tension of the tape varies depending on the position of the carriage 154 and the spring constant and displacement of the spring 172. When the carriage 154 moves along the rails 150 and 152, the intensity of the light emitted by the light source 174 and sensed by the photocell 176 varies in accordance with the position of the carriage. 154. The signal on the output 178 of the photocell 176 is coupled through the light intensity measuring circuit 180 to the servo control electronics 182. The servo control electronics 182 then produces a control signal to the reel motors, etc.

While the present invention has been particularly shown and described with reference to two preferred embodiments, it will be understood by those skilled in the art that various changes in form and detail may be made therein without departing from the spirit and scope of the invention.

What is claimed is:

1. In an improved video magnetic tape recording/-playback transport apparatus including a supply of magnetic recording tape having a first end portion wound around a tape supply means and having a second end portion wound around a tape take-up means, a tape driving capstan intermediate to the tape supply means and the tape take-up means and engaging the tape, a helical head scanner assembly positioned intermediate the capstan and one of the tape means having a mid-length portion of the tape helically wrapped thereabout, tape tension sensing means for producing a first and a second signal, servo control means responsive to the first and to the second signal and operative to generate a first and a second servo control signal, first motor means responsive to said first servo signal and operative to drive said tape supply means and second motor means responsive to said second servo signal and operative to drive said tape take-up means, an improved tension sensing means comprising:

a first tension guide assembly intermediate the helical head scanner and the tape supply means including
        first tape guide means movable under tension between a first and a second position for engaging with and guiding the tape,
        a first arm carrying said first tape guide means, said first arm being movable along an arcuate path between said first and said second position,
        a first light source mounted on said first arm and serving to emit an illuminating beam of light,
        a first photocell means for sensing the location of said first guide means between said first and second positions, said first photocell means being responsive to the amount of light illuminating it and operative to produce a first signal, said first photocell means being mounted on said first tape guide means, a first fixed plate disposed between said first light source and said first photocell means, said first plate including an arcuately-shaped aperture that may serve to partially block the light emitted by said first light source so that an amount of light corresponding to the location of said first tape guide means illuminates said first photocell means;

a second tension guide assembly intermediate the helical head scanner and the tape take-up means including second tape guide means movable under tension between a third and fourth position for engaging with and guiding the tape, a second arm carrying said second tape guide means, said second arm being movable along an arcuate path between said third and fourth positions, a second light source mounted on said second arm and serving to emit an illuminating beam of light, a second photocell means for sensing the location of said second guide means between said third and fourth positions, said second photocell means being responsive to the amount of light illuminating it and operative to produce a second signal, said photocell means being mounted on said second tape guide means;

a second fixed plate disposed between said second light source and said second photocell means, said second plate including an arcuately-shaped aperture that may serve to partially block the light emitted by said second light source so that an amount of light corresponding to the location of said second tape guide means illuminates said second photocell means.

2. In an improved video magnetic tape recording/playback transport apparatus as recited in claim 1 wherein said first photocell means includes first and second photocell connected in a differential series circuit configuration and whereas said second photocell means includes third and fourth photocells connected in a differential series circuit configuration.

3. In an improved video magnetic tape recording/playback transport apparatus including a supply of magnetic recording tape having a first end portion wound around a tape supply means and having a second end portion wound around a tape take-up means, a tape driving capstan intermediate to the tape supply means and the tape take-up means and engaging the tape, a helical head scanner assembly positioned intermediate the capstan and one of the tape means having a mid-length portion of the tape helically wrapped thereabout, tape tension sensing means for producing a first and a second servo control signal, first motor means responsive to said first servo signal and operative to drive said tape supply means, and second motor means being responsive to said second servo signal and operative to drive said take-up means, an improved tape tension sensing means comprising:

a first tension guide assembly intermediate the helical head scanner and the tape supply means including a first pair of rails, a first carriage linearly movable along said first pair of rails between a first and a second position, and a first tape guide means carried by said first carriage; and a second tension guide assembly intermediate the helical head scanner and the tape take-up means including a second pair of rails, a second carriage linearly movable along said second pair of rails between a third and a fourth position, and a second tape guide means carried by said second carriage.

4. In an improved video magnetic tape recording/playback transport apparatus as recited in claim 3 wherein:

said first tension guide assembly further includes a first block and a first tension spring coupled between said first block and said first carriage and serving to bias said first carriage towards said first position; and said second tension guide assembly further includes a second block and a second tension spring coupled between said second block and said second carriage and serving to bias said second carriage toward said third position.

5. In an improved video magnetic tape recording/playback transport apparatus as recited in claim 4 wherein:

said first carriage includes first rotary bushing means for engaging surfaces of said first pair of rails; and said second carriage includes a second rotary bushing means for engaging surfaces of said second pair of rails, whereby said first and second rotary bushing means facilitate the sliding movement of said first and second carriages along their respective pairs of rails.

* * * * *